(12) United States Patent
Sorensen

(10) Patent No.: US 7,568,903 B2
(45) Date of Patent: Aug. 4, 2009

(54) STACK MOLD CARRIER

(75) Inventor: Mikael-Ligaard Sorensen, St. Fuglede (DK)

(73) Assignee: FIH (Hong Kong) Limited, Kowloon (HK)

( * ) Notice: Subject to any disclaimer, the term of this patent is extended or adjusted under 35 U.S.C. 154(b) by 130 days.

(21) Appl. No.: 11/626,708

(22) Filed: Jan. 24, 2007

(65) Prior Publication Data

US 2008/0075801 A1      Mar. 27, 2008

(30) Foreign Application Priority Data

Sep. 22, 2006      (CN) .................. 2006 1 0062737

(51) Int. Cl.
*B29C 45/17* (2006.01)
(52) U.S. Cl. .................... 425/190; 425/338; 425/450.1; 425/472; 425/588; 425/589
(58) Field of Classification Search ................. 425/190, 425/338, 450.1, 472, 588, 589
See application file for complete search history.

(56) References Cited

U.S. PATENT DOCUMENTS

| | | | | |
|---|---|---|---|---|
| 4,154,566 A | * | 5/1979 | Ward | 425/338 |
| 4,408,981 A | * | 10/1983 | Brown | 425/338 |
| 4,929,166 A | * | 5/1990 | DiSimone et al. | 425/338 |
| 5,772,420 A | * | 6/1998 | Holmes | 425/588 |
| 6,155,811 A | * | 12/2000 | Looije et al. | 425/338 |
| 6,503,075 B1 | * | 1/2003 | Schad et al. | 425/588 |
| 6,709,251 B2 | * | 3/2004 | Payette et al. | 425/588 |
| 7,128,565 B2 | * | 10/2006 | DiSimone et al. | 425/588 |

* cited by examiner

*Primary Examiner*—James Mackey
(74) *Attorney, Agent, or Firm*—Steven M. Reiss

(57) ABSTRACT

A stack mold carrier (200) for use in a stack mold system (500) is provided. The stack mold system includes a pair of rails (600), the stack mold carrier, a mold (not labeled) and a cooling assembly (40). The stack mold carrier includes a carrier portion (20) and a pair of bridge portions (22) extending from opposite ends of the carrier portion. The stack mold carrier strides over the rails with each of the bridge portions slidably mounted on a corresponding one of the rails. The mold includes a middle mold plate (504), a stationary portion (506) and a movable portion (502). The middle mold plate is supported on the carrier portion and is movable with the stack mold carrier relative to the stationary portion and the movable portion along the rails. The cooling assembly is configured for the mold installed on the carrier portion.

15 Claims, 8 Drawing Sheets

STACK MOLD CARRIER

BACKGROUND OF THE INVENTION

1. Field of the Invention

The present invention relates to carriers and, particularly, to a stack mold carrier functioning to support a stack mold.

2. Description of Related Art

Stack molds are different from traditional single plate molds. Stack molds first appeared in the packing industry, but with the development of scientific technologies, the stack mold has become widely used in various fields. Nowadays, stack molds can be used to mold articles of many different sizes, including large articles.

An example of a related stack mold system has tie bars that pass through the mold plates, thereby supporting them directly. Removing the molds from the machine requires the tie bars to be withdrawn. This is a time consuming process that requires additional space behind the molding machine's clamp to accommodate the tie bars in their withdrawn positions.

Early stack mold carriers were attachments to the mold center section that supported it in the molding machine and allowed the center section to slide along the machine's tie bars. Removal of the mold also required removal of the carriers, as they were not attached to the machine. This was an added complication, adding to the time needed to change the mold. Thus, mold carriers to which a stack mold can be quickly attached and yet remain safely installed in the machine when the stack mold is removed were developed. The mold carrier itself can be easily removed from the machine if required. However, the mold carrier cannot support a large stack mold because screws or any other elements are used to support the large stack that cannot carry heavy weight.

What is needed, therefore, is a stack mold carrier that overcomes the above-mentioned shortcomings.

SUMMARY OF THE INVENTION

In one embodiment thereof, a stack mold carrier is configured (i.e., structured and arranged) for operating as a stack mold system. The stack mold system includes a middle mold plate. The stack mold carrier includes a carrier portion, two bridge portions and a connecting means. The carrier portion comprises an upper wall, and the upper wall of the carrier portion has a mounting portion formed thereon. The two bridge portions each extend from the carrier portion transversely. The connecting means is configured to enable the stack mold carrier to move and slide within the stack mold system.

Other advantages and novel features will become more apparent from the following detailed description when taken in conjunction with the accompanying drawings.

BRIEF DESCRIPTION OF THE DRAWINGS

Many aspects of the stack mold carrier can be better understood with reference to the following drawings. Drawings are not necessarily drawn to scale, the emphasis instead being placed upon clearly illustrating the principles of the present stack mold carrier. Moreover, in the drawings, like reference numerals designate corresponding parts throughout the several views.

DETAILED DESCRIPTION OF PREFERRED EMBODIMENTS

Figure 1:
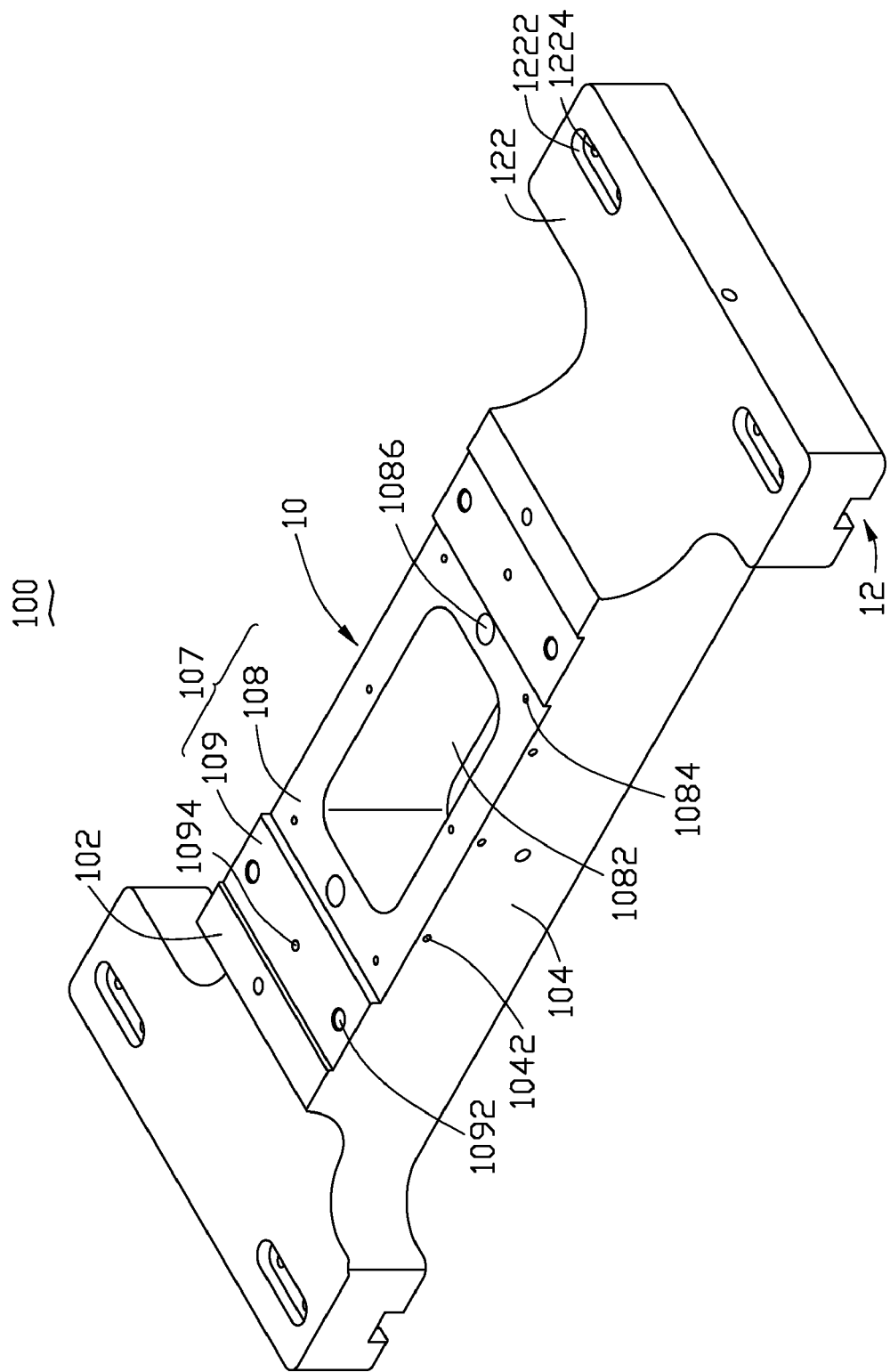
FIG. 1 is an isometric view of a stack mold carrier in accordance with a first preferred embodiment of the present invention.
Figure 2:
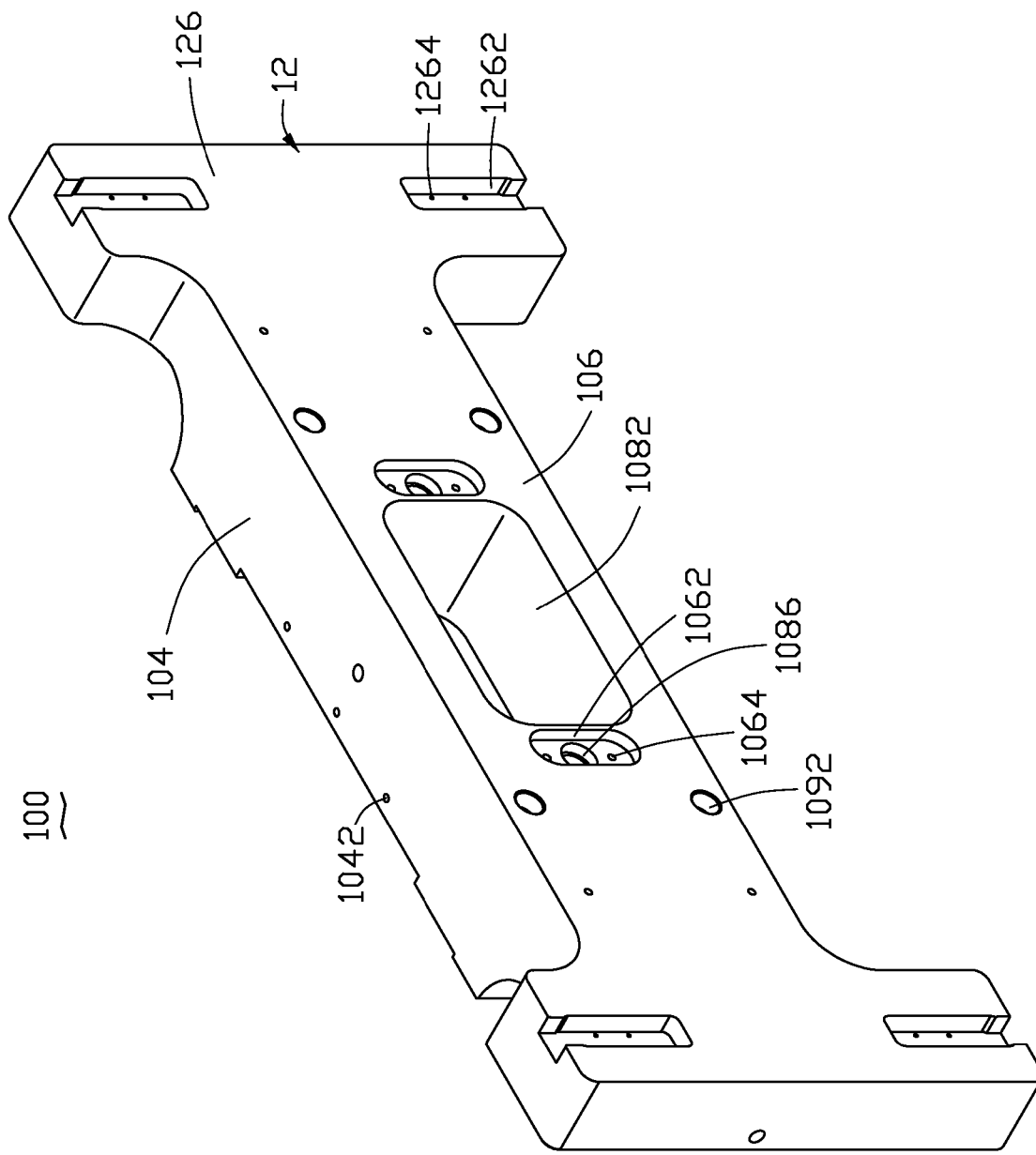
FIG. 2 is similar to FIG. 8, but shows another aspect of the stack mold carrier shown in FIG. 1.

Referring now to the drawings in detail, FIGS. 1 and 2 show various parts of a stack mold carrier 100 of a first embodiment of the present invention. The stack mold carrier 100 is generally bridge-shaped and includes a carrier portion 10 and two bridge portions 12. The two bridge portions 12 are respectively disposed at two sides of the carrier portions 10, facing towards each other. The carrier portion 10 is used to carry a middle mold plate 504 of a stack mold system 500 (shown in FIG. 8), while each bridge portion 12 enables the middle mold plate 504 to move slidably along each rail 600 of the stack mold system 500 (shown in FIG. 8).

The carrier portion 10 can be cube-shaped and includes an upper wall 102, two sidewalls 104, and a lower wall 106. The upper wall 102 has a mounting portion 108 and two adjusting portions 109 formed thereon. The mounting portion 108 is located between the two adjusting portions 109 and cooperatively forms a stepped groove 107 therebetween. An accommodating space 1082 with a roughly rectangular shape is defined through the carrier portion 10 and is located in the middle of the mounting portion 108. The accommodating space 1082 divides the mounting portions into four sections (not labeled), and the four sections connect with each other. Two sections of the mounting portions provide a relatively longer length and have a plurality of first screw holes 1084 defined therein. The first screw holes 1084 are arranged evenly and distributed in a symmetrically opposite manner. The other two sections with a relatively shorter length have two guiding holes 1086 respectively defined therethrough with a symmetrically opposite pattern. Each of the two adjusting portions 109 has two first stepped positioning holes 1092 defined therethrough and has a second screw hole 1094 defined therein. Each second screw hole 1094 is located between the first positioning holes 1092. A plurality of third screw holes 1042 are disposed along a line in each sidewall 104 and are arranged adjacent to the first screw holes 1084. The lower wall 106 has two recesses 1062 and four fourth screw holes 1064 formed therein corresponding to the guiding holes 1086. The guiding holes 1086 and the fourth screw holes 1064 are positioned so as to communicate with the recesses 1062.

Each of the two bridge portions 12 includes an upper portion 122 and a lower portion 126. The upper portion 122 extends in a substantial curve from the upper wall 102 of the carrier portion 10, and the lower portion 126 substantially extends transversely from the lower wall 106 of the carrier portion 10. The upper portion 122 defines two elongated supporting grooves 1222 adjacent to two ends thereof and four fifth screw holes 1224 below the supporting grooves. The two supporting grooves 1222 are located in line with each other. Two fifth screw holes 1224 are positioned to communicate with one corresponding supporting groove 1222. The lower portion 126 has two holding grooves 1262 and four sixth screw holes 1264 defined therein. Two holding grooves 1262 correspond to two supporting grooves 1222 and are structured with two openings (not labeled) exposed transversely to outside.

Figure 3:
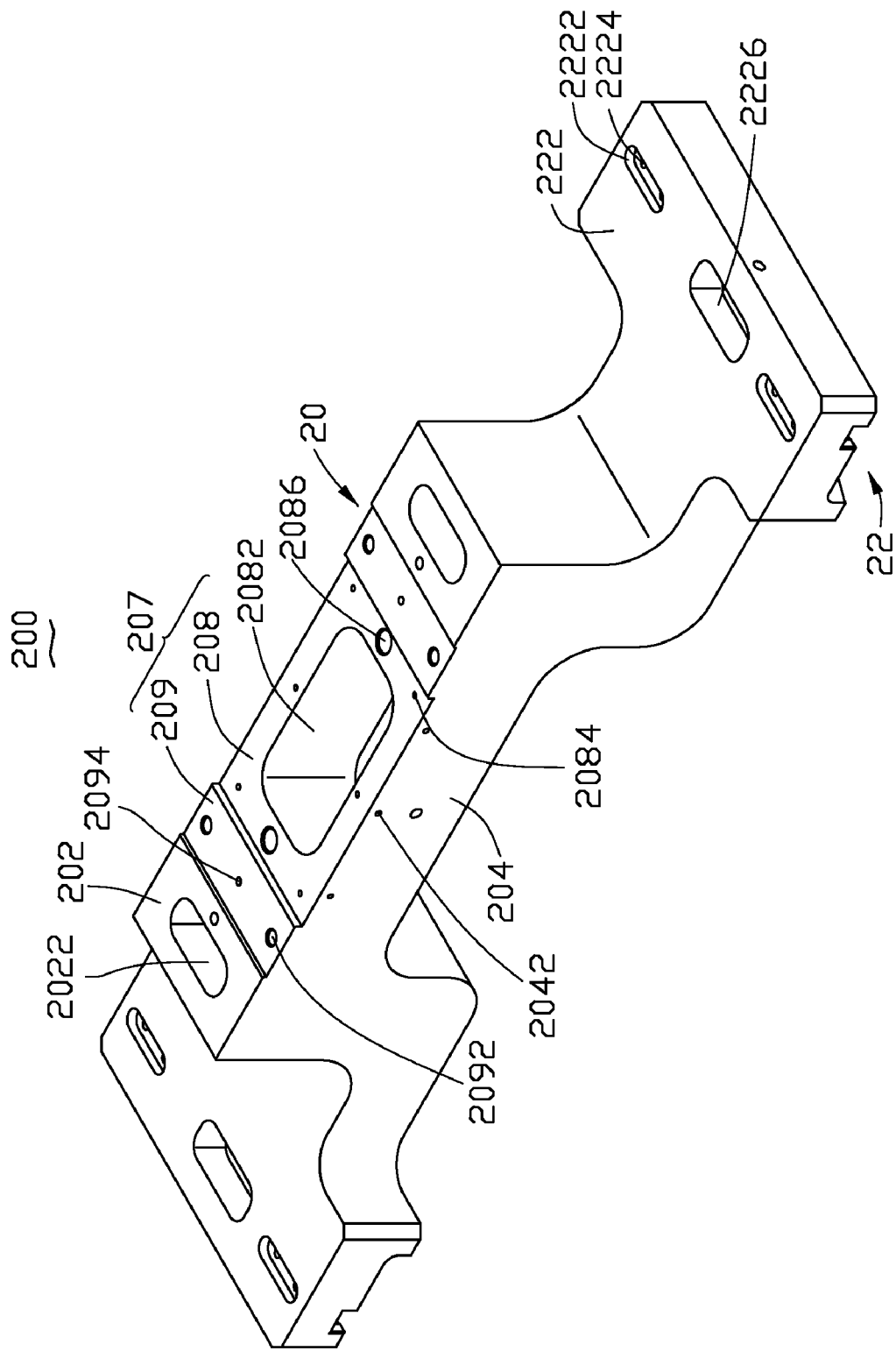
FIG. 3 is an isometric view of a stack mold carrier in accordance with a second alternative preferred embodiment.
Figure 4:
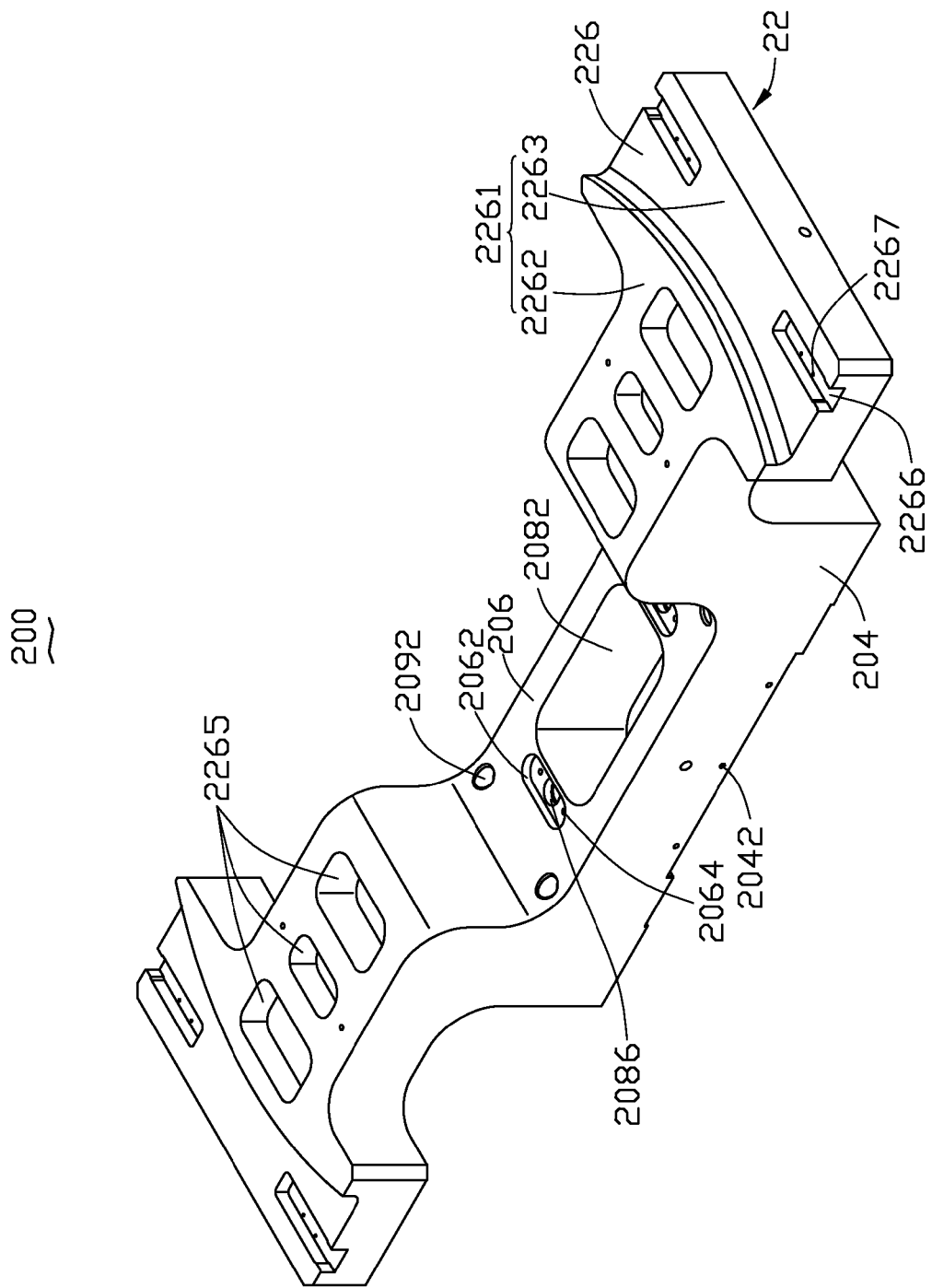
FIG. 4 is similar to FIG. 3, but shows another aspect of the stack mold carrier shown in FIG. 3.

Referring now to FIGS. 3 and 4, a stack mold carrier 200 according to a second embodiment of the present invention is shown. The stack mold carrier 200 is generally similar to the stack mold carrier 100 in the first embodiment, except for a few obvious modifications. The stack mold carrier 200 includes a carrier portion 20 and two bridge portions 22. The carrier portion 20 is similar to the carrier portion 10, and the following mentioned features have essentially the same structure as that of the carrier portion 10. More specifically, the carrier portion 20 includes an upper wall 202, two sidewalls 204 and a lower wall 206. The carrier portion 20 includes a stepped groove 207, a mounting portion 208, an adjusting portion 209 formed thereon. The mounting portion 208 includes an accommodating space 2082, a plurality of first mating holes 2084 (i.e. screw holes) and two through guiding holes 2086 defined therein. The adjusting portion 209 and the sidewalls 204 respectively contain two second stepped positioning holes 2092, a plurality of second mating holes 2094 (i.e. screw holes) and a plurality of third mating holes 2042 formed therein. The lower wall 206 also comprises two recesses 2062 and four fourth mating holes 2064 (i.e. screw holes) defined therein. Besides, the carrier portion 20 is slightly different from the carrier portion 10 in that the upper wall 202 of the carrier portion 20 has two essentially rectangular cavities 2022 defined therein. The two cavities 2022 are disposed symmetrically opposite to each other and adjacent to the two adjusting portions 209.

The bridge portions 22 of the second embodiment are substantially different from the bridge portions 12 of the first embodiment. Each of the two bridge portions 22 includes an upper portion 222 and a lower portion 226. The upper portion 222 and the lower portion 226 extend in a substantial curve from the upper wall 202 and the lower wall 206 of the carrier portion 20, respectively. A distal end (not labeled) of the upper portion 222 has two supporting grooves 2222 and four fifth mating holes 1224 (i.e. screw holes) defined therein and has a through cavity 2226 defined therethrough. The two supporting grooves 2222 are located in line with each other, and the through cavity 2226 is arranged between the two supporting grooves 2222. Two fifth screw holes 1224 are defined inside each supporting groove 1222. The lower portion 226 has an annular stepped portion 2261 formed thereon. The stepped portion 2261 separates the lower portion 226 into a first end portion 2262 and a second end portion 2263. A plurality of concaved hollows 2265 are formed on the first end portion 2262 in line with each other. Two holding grooves 2266 and four sixth mating holes 2267 (i.e. screw holes) are defined in the first end portion 2262 in positions corresponding to those of the supporting grooves 2222 and the fifth mating holes 2224. Each holding groove 2266 defines an opening (not labeled) exposed transversely to outside.

Figure 5:
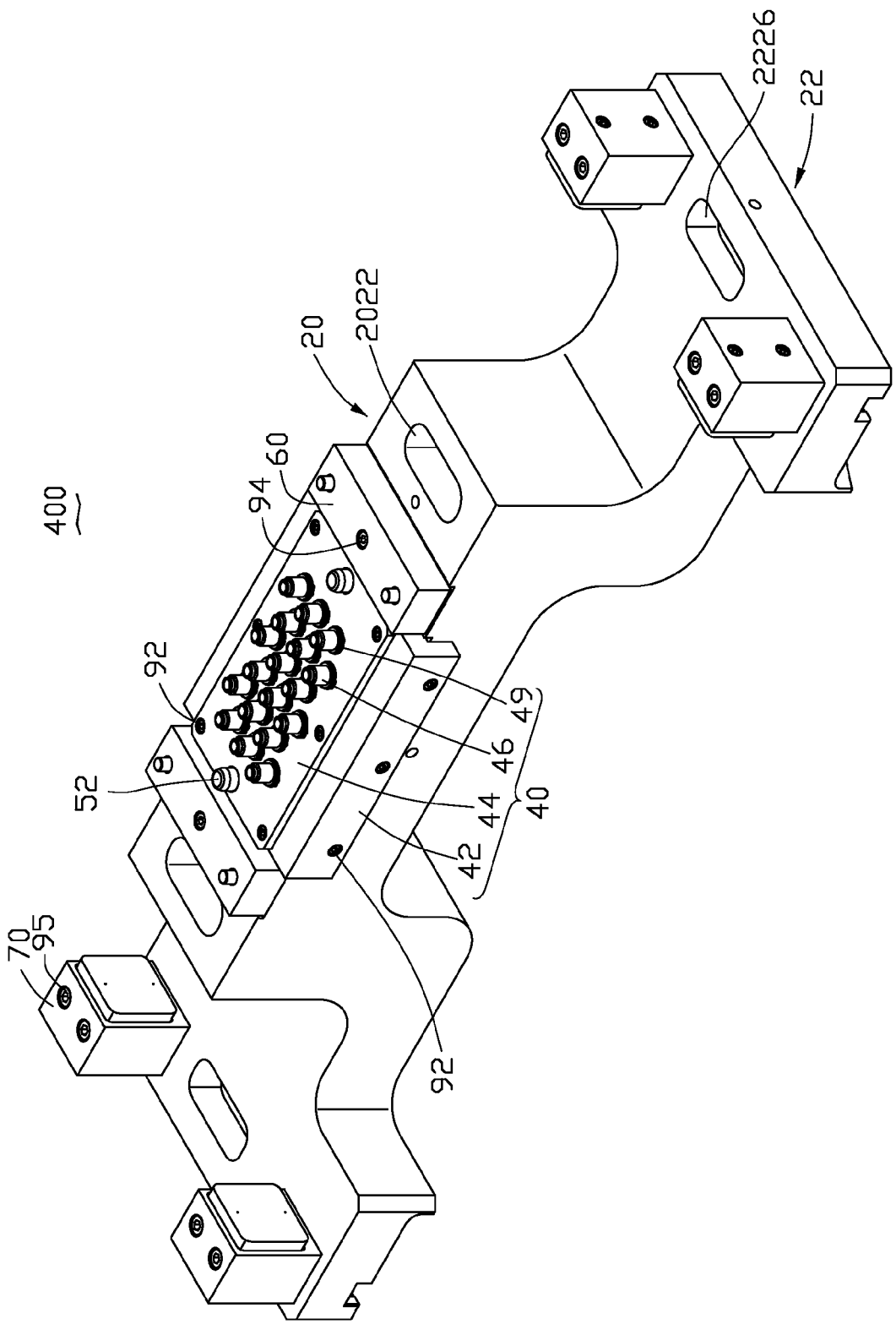
FIG. 5 is an assembled view of the stack mold carrier shown in FIG. 3 with a cooling assembly, a guiding member, two adjusting blocks, four supporting blocks and four sliding members.
Figure 6:
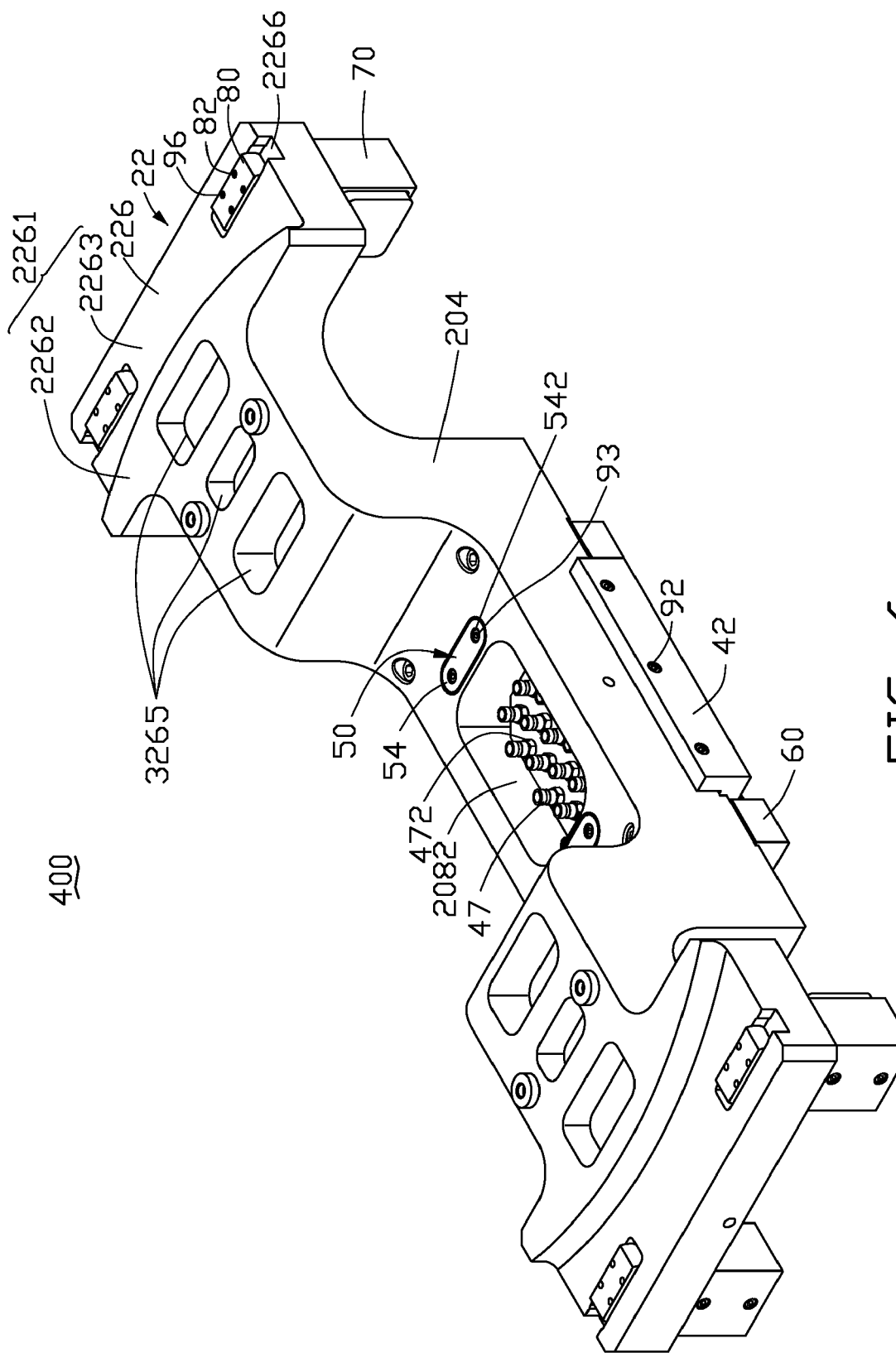
FIG. 6 is similar to FIG. 5, but shows another aspect of the assembled stack mold carrier shown in FIG. 5.

Referring also to FIGS. 5 and 6, two different aspects of the stack mold carrier 200 assembled with a cooling assembly 40, two guiding members 50, two adjusting blocks 60, four supporting blocks 70, and four sliding members 80, forming a new stack mold carrier 400 are shown. Obviously, the above assemblies/members can, in an alternative embodiment, instead be assembled with the stack mold carrier 100.

Figure 7:
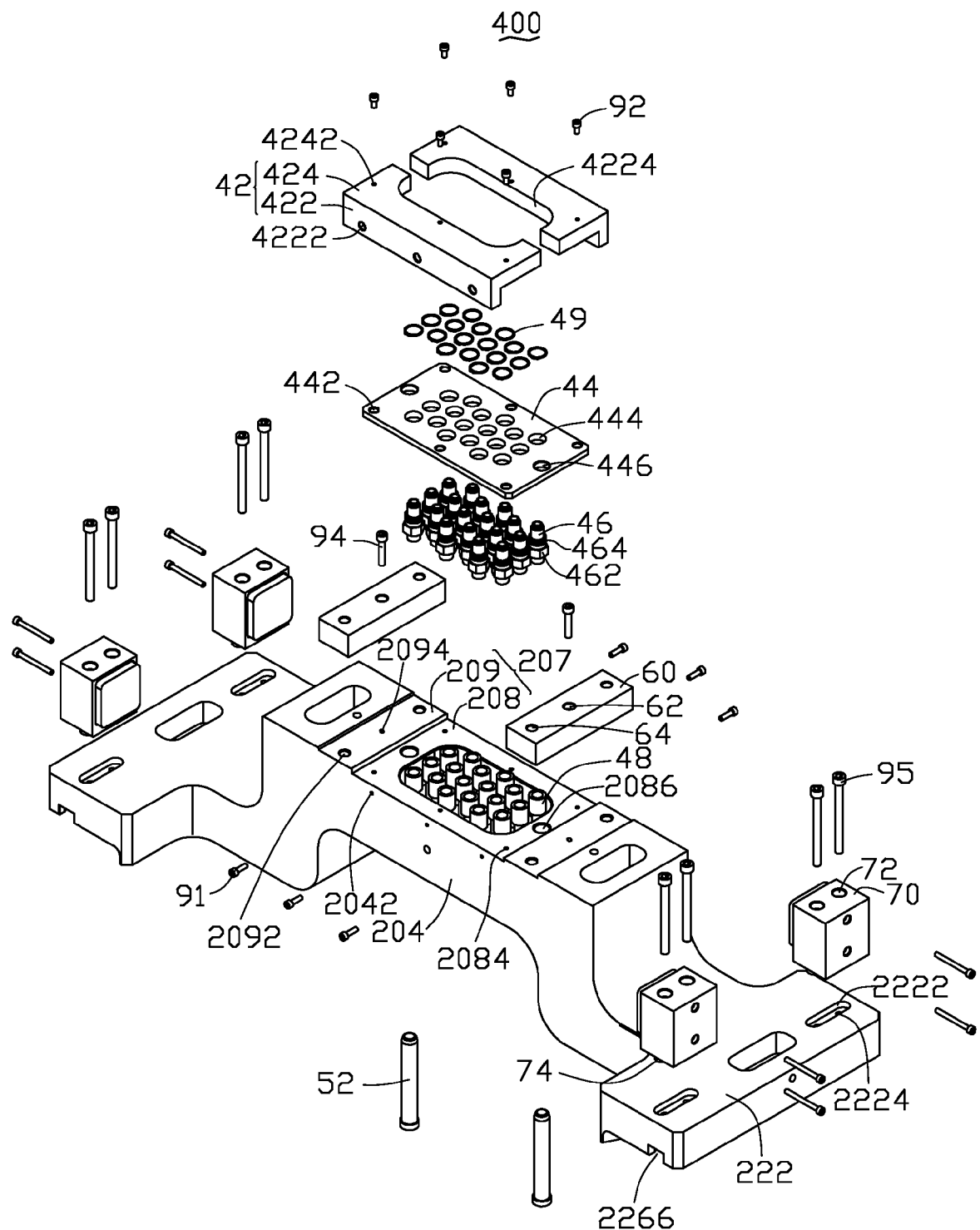
FIG. 7 is an exploded, isometric view of the assembled stack mold carrier shown in FIG. 5.

Referring further to FIG. 7, the cooling assembly 40 is configured for a middle mold plate 504 (shown in FIG. 8) installed on the carrier portion 20 and includes a nozzle holder (not labeled) that preferably contains two bent plates 42 and a planar plate 44. In addition, the cooling assembly 40 includes a plurality of first nozzles 46, a plurality of second nozzles 47, a plurality of sleeves 48, and a plurality of rings 49. The second nozzles 47, the sleeves 48 and the rings 49 are of a quantity essentially identical to that of the first nozzles 46.

Each bent plate 42 is bent to mate with the mounting portion 208 of the carrier portion 20 and includes a first end portion 422 and a second end portion 424 perpendicular to each other. The first end portion 422 has a plurality of first engaging holes 4222 (i.e. screw holes) defined therethrough positioned corresponding to the third mating holes 2042 of the sidewall 204 of the carrier portion 20. The second end portion 424 includes a recessed wall 4224 and has a plurality of second engaging holes 4242 (i.e. screw holes) formed therethrough corresponding to the first mating holes 2084 of the mounting portion 208.

The planar plate 44 is generally rectangular-shaped with a size essentially equal to that of the mounting portion 208. The planar plate 44 has a plurality of third engaging holes 442 (i.e. screw holes), a plurality of nozzle holes 444 and two positioning holes 446 defined therethrough. The screw holes 442 and the two positioning holes 446 are defined around the though holes 444 and are positioned corresponding to the first mating holes 2084 of the mounting portion 208 and the guiding holes 2086 of the mounting portion 208 respectively. When the planar plate 44 is assembled with the stack mold carrier 200, the nozzle holes 444 are located right above the accommodating space 2082 of the mounting portion 208.

The first nozzles 46 and the second nozzles 47 are roughly identical in structure and function together to flow cooling liquid. Each first nozzle 46 is a substantially hollow cylinder with two open ends (not labeled). One end of the first nozzle 46 is configured to engage through the nozzle hole 444 of the planar plate 44, the other end of the first nozzle 46 has a shape and size essentially identical to that of the second nozzle 47. A first hexagonal flange 462 is disposed around the first nozzle 46, and a circumferential slot 464 is defined in the first nozzle 46 contiguous to the hexagonal flange 462. The second nozzle 47 has a second hexagonal flange 472 formed therearound.

Each sleeve 48 is a generally hollow cylinder with two opening ends (not labeled) and is essentially dimensioned to enable a firm connection with the first nozzle 46 and the second nozzle 47, i.e., the sleeves 48 each has two opposite ends thereof to firmly and partially secure the respective first nozzle 46 and the respective second nozzle 47 therein.

Each ring 49 is provided with some kind of elastic and is essentially structured to engage firmly into the circumferential slot 464 of the first nozzle 46. The ring 49 has a slightly bigger size than that of the nozzle hole 444 of the planar plate 44.

Figure 8:
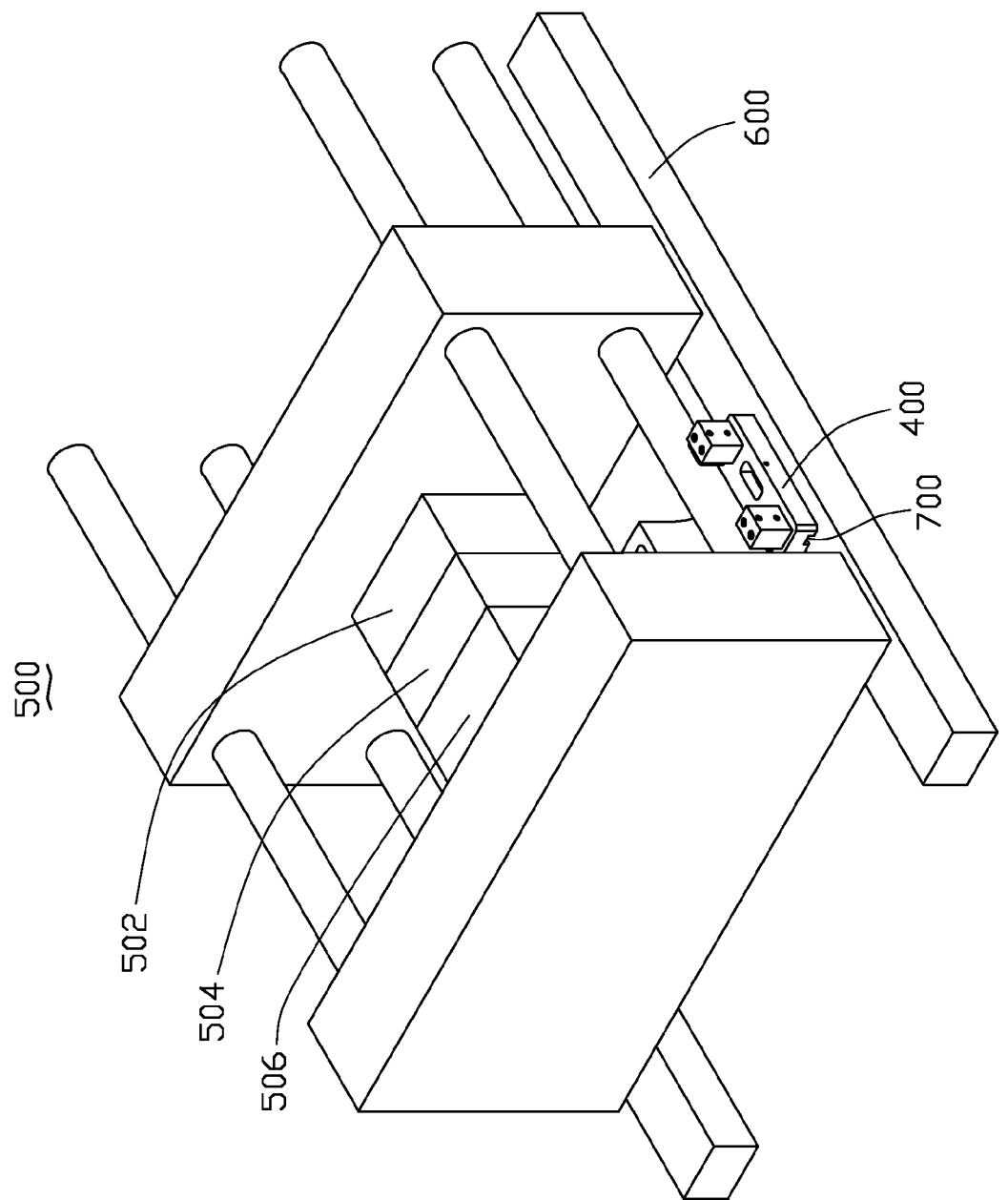
FIG. 8 is an isometric view of a stack mold system that incorporates a movable mold, a middle mold plate, a stationary mold, the assembled stack mold carrier shown in FIG. 5, and two rails.

Each guiding member 50 is configured to engage into the recess 2062 and the guiding holes 2086 of the stack mold carrier 200 to guide the assembled middle mold plate 504 (shown in FIG. 8). The positioning element 50 contains a roughly cylindrical guiding pin 52 and a holder 54. The guiding pin 52 and the holder 54 are of dimensions essentially equal to those of the guiding hole 2086 and the recess 2062 respectively. The holder 52 has two fourth engaging holes 542

(i.e. screw holes) defined therethrough, corresponding to the two fourth mating holes 2064 of the carrier portion 20.

Each adjusting block 60 is generally cube-shaped and is adapted to evenly fit with the adjusting portion 209 of the carrier portion 20. The adjusting block 60 has a fifth engaging hole 62 (i.e. screw hole) defined therein and has two third positioning holes 64 defined therethrough. The fifth engaging hole 62 and the two third positioning holes 64 respectively correspond to the second mating holes 2094 and the second positioning holes 2092 of the carrier portion 20.

Each supporting block 70 is structured and arranged to stabilize the stack mold carrier 200 during a process of the middle mold plate 504 being mounted on the stack mold carrier 200. The supporting block 70 is generally cube-shaped and includes two sixth engaging holes (i.e. screw holes) 72 defined therethrough and a protrusion 74 formed thereon. The sixth engaging holes 72 extend through the protrusion 74 and correspond to the two fifth mating holes 2224. The protrusion 74 is dimensioned and arranged to hold the supporting block 70 within the supporting groove 2222 of the bridge portion 22.

Each sliding member 80, for example a sliding bearing, is configured and arranged to connect the bridge portion 22 of the stack mold carrier 200 to the rail of the stack mold system (shown in FIG. 8). The sliding member 80 is structured for being secured into the holding groove 2266 of the bridge portion 22 and has a plurality of seventh engaging holes 82 (i.e. screw holes) defined therein. The seventh engaging holes 82 correspond to the sixth mating holes 2267 of the bridge portion 22.

The above cooling assembly 40, guiding members 50, adjusting blocks 60, supporting blocks 70 and sliding members 80 can be assembled with the stack mold carrier 200 independently. In assembly, a plurality of corresponding first fixing members 91, second fixing members 92, third fixing members 93, fourth fixing members 94, fifth fixing members 95, sixth fixing members 96 are provided. The above corresponding fixing members are preferably threaded screws.

The two bent plates 42 of the cooling assembly 40 are attached to the mounting portion 208 of the carrier portion 20 via the first fixing members 91 engaging into the first engaging holes 4222 of the bent plates 42 and the third mating holes 2042 of the carrier portion 20. In this case, the first portions 422 and the second portions 424 of the bent plates 42 respectively abut the sidewalls 204 and a concaved wall (not labeled) of the mounting portion 208. The planar plate 44 of the cooling assembly 40 is firmly secured on the two bent plates 42 by rotating the second fixing members into the third engaging holes 442 of the planar plate 44 and the second engaging holes 4242 of the bent plates 42.

The first nozzles 46 pass through the corresponding nozzle holes 444 of the planar plate 44 with the circumferential slots 464 exposed right above the planar plate 44. The rings 49 are respectively placed around the first nozzles 46 and engage into the corresponding circumferential slots 464. At this time, the first nozzles 46 are firmly secured with the planar plate 44 with the flange 462 of the first nozzles 46 and the rings 49 resisting the lower and upper surfaces of the planar plate 44. Then, the second nozzles 47 are respectively nested with the sleeves and then are placed together over the first nozzles 46. In this case, the second nozzles 47 are accommodated in the accommodating space 2082 of the carrier portion 20.

The guiding members 50 are then assembled with the stack mold carrier 200. The guiding pins 52 are inserted into and exposed through the guiding holes 2086 of the carrier portion 20. Then, the holders 54 of the guiding members 50 are firmly received in the recess 2062 of the carrier portion 20 via the third fixing members 93 engaging into the fourth engaging holes 542 of the guiding members 50 and the fourth mating holes 2064 of the carrier portion. Thus, the guiding pins 52 are positioned right above the mounting portion 208 of the carrier portion 20 and cannot pop out from the carrier portion 20.

Then, the two adjusting blocks 60 are placed on the two adjusting portion 209 of the carrier portion 20 with the respective third positioning holes 64 of the adjusting blocks 60 aligned with the respective second positioning holes 2092 of the carrier portion 20. The fourth fixing members 94 fix the respective adjusting block 60 to the respective adjusting block 60 by rotation into the fifth engaging holes 62 of the adjusting blocks 60 and the second mating holes 2094 of the adjusting portion 209.

The supporting blocks 70 are further evenly placed and engage into the supporting grooves 2222 of the bridging portions 22. In this case, the protrusions 74 of the supporting blocks 70 engage into the supporting grooves 2222. Then, the fifth fixing members 95 are rotated into the sixth engaging holes 72 of the supporting blocks 70 and fifth mating holes 2224, enabling the supporting blocks 70 to fix together with the bridge portions 22.

The sliding members 80 are finally received and attached within the holding grooves 2266 of the bridge portions 22, whereby the sixth fixing members 96 engages into the seventh engaging holes 82 and the sixth mating holes 2267 of the bridge portions 22 respectively. Thus, the stack mold carrier 400 is finished.

FIG. 8 shows a stack mold system 500 that incorporates the stack mold carrier 400, a mold (not labeled), two rails 600, and the cooling assembly (not shown). The mold includes a movable mold plate 502, the middle mold plate 504, a stationary mold plate 506. The middle mold plate 504 is carried and supported by the stack mold carrier 400 and connects with the stationary mold plate 506 and the movable mold plate 502. Then, the stack mold carrier 400 is placed and guided by the two parallel rails 600 and can be urged to move and slide along the rails 600 via a connecting means 700. The connecting means 700, preferably the sliding member 80 with the holding groove 2266 of the stack mold carrier 400, is configured for facilitating the relative sliding movement between the stack mold carrier 400 and the rails 600. The cooling assembly 40 includes the plurality of nozzles 46, 47 fixed to the carrier portion 20 via the mounting plate (i.e., the bent plates 42 and the planar plate 44) which is mounted on the top surface of the carrier portion 20 and covers the accommodating space 2082.

In use, a main advantage of the stack mold carrier 400 is that the stack mold carrier 400 is capable of withstanding very heavy weights, because the particular structure of the stack mold carrier 400 enables the carrier portion 20 and the bridge portions 22 to carry and support the middle mold plate 504.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stack mold carrier for use in a stack mold system, the stack mold system comprising a middle mold plate, and the stack mold carrier comprising:

a carrier portion including an upper wall, the upper wall of the carrier portion having a mounting portion formed thereon configured for supporting the middle mold plate;

two spaced bridge portions each extending from the carrier portion transversely; and a connecting means being configured to enable the stack mold carrier to move and slide within the stack mold system.

2. The stack mold carrier as claimed in claim 1, wherein the two bridge portions each comprises an upper portion and a lower portion, the carrier portion further comprises a lower wall, the upper portion extends in a curve from the upper wall of the carrier portion, and the lower portion extends substantially transversely from the lower wall of the carrier portion.

3. The stack mold carrier as claimed in claim 1, wherein the two bridge portions each comprises an upper portion and a lower portion, the carrier portion further comprises a lower wall, the upper portion and the lower portion of the bridge portion extend substantially curvedly from the upper wall and the lower wall of the carrier portion respectively.

4. The stack mold carrier as claimed in claim 3, wherein the upper portion of the bridge portion has at least one supporting groove defined therein and has a through cavity defined therethrough, the through cavity being arranged in line with the at least one supporting groove.

5. The stack mold carrier as claimed in claim 3, wherein the lower portion of the bridge portion has a stepped portion formed thereon, the stepped portion divides the lower portion into a first end portion and a second end portion, the first end portion has a plurality of concaved rooms formed thereon, the second end portion has at least one holding groove defined therein.

6. The stack mold carrier as claimed in claim 1, wherein the connector comprises at least one holding groove and at least one sliding member, the at least one holding groove each being defined in a corresponding bridge portion, the at least one sliding member each being secured in a corresponding holding groove.

7. The stack mold carrier as claimed in claim 1, further comprising two guiding members, the guiding members each comprising a stepped guiding pin and a holder, the mounting portion having two stepped guiding holes defined therethrough and having two recesses below the stepped guiding holes, the guiding pins engaging into the respective guiding holes, the holders engaging into the respective recesses.

8. The stack mold carrier as claimed in claim 1, further comprising at least one supporting block, the bridge portions having at least one supporting groove defined therein, the supporting blocks being respectively attached to the supporting grooves.

9. The stack mold carrier as claimed in claim 1, further comprising two adjusting blocks, the upper wall of the carrier portion further having two adjusting portions formed thereon contiguous to the mounting portion, the adjusting blocks each being fixed to the adjusting portion.

10. The stack mold carrier as claimed in claim 9, wherein the upper wall of the carrier portion has two cavities defined therein, the cavities are symmetrically opposite disposed adjacent to the two adjusting portions.

11. The stack mold carrier as claimed in claim 1, further comprising a cooling assembly, the cooling assembly is fixed to the mounting portion.

12. The stack mold carrier as claimed in claim 11, wherein the cooling assembly comprises two bent plates, a planar plate, a plurality of first nozzles and a plurality of rings, and the rings fix the first nozzles with the bent plates and the planar plate.

13. The stack mold carrier as claimed in claim 12, wherein the two bent plates each is bent to mate with the mounting portion of the carrier portion and is attached to the mounting portion, the planar plate has a plurality of nozzle holes defined therethrough, the first nozzles engages through the nozzle holes, and the planar plate is attached on the mounting portion between the bent plates.

14. The stack mold carrier as claimed in claim 13, wherein the cooling assembly further comprises a plurality of second nozzles, the first and second nozzles each has a hexagonal flange disposed therearound and has a circumferential slot defined therein contiguous to the hexagonal flange, the ring has a bigger size than that of the nozzle hole of the planar plate, and each of the rings engages into a corresponding circumferential slot and abut the planar plate.

15. The stack mold carrier as claimed in claim 14, wherein the cooling assembly further comprises a plurality of sleeves, and the sleeves each has two opposite ends thereof to firmly and partially secure the respective first nozzle and the respective second nozzle therein.

* * * * *